March 15, 1966 L. D. MERKL ET AL 3,240,862

ADJUSTABLE GASKET SUPPORT FOR RFI SHIELDED CABINETS

Filed July 6, 1964 2 Sheets-Sheet 1

Inventors
Lloyd D. Merkl
Emil N. Popovich
Otto E. Werner
By Ira Milton Jones
Attorney

ADJUSTABLE GASKET SUPPORT FOR RFI SHIELDED CABINETS

Filed July 6, 1964 2 Sheets-Sheet 2

Inventors
Lloyd D. Merkl
Emil N. Popovich
Otto E. Werner
By Ira Milton Jones
Attorney United States Patent Office 3,240,862
Patented Mar. 15, 1966

3,240,862

ADJUSTABLE GASKET SUPPORT FOR RFI SHIELDED CABINETS

Lloyd D. Merkl and Emil N. Popovich, Mayville, Wis., and Otto E. Werner, Skokie, Ill., assignors to Mayville Metal Products Co., Mayville, Wis., a corporation of Wisconsin Filed July 6, 1964, Ser. No. 380,491
10 Claims. (Cl. 174—35)

This invention relates to radio frequency interference shielded enclosures in which radio equipment is housed, and which are referred to as RFI cabinets.

RFI cabinets of this type are fabricated from sheet metal and provide a total enclosure for radio equipment housed therein. Their purpose is to prevent egress of electrical impulses at radio frequencies generated by such equipment from adversely affecting the operation of nearby radio equipment outside the cabinet, and vice versa, to prevent radio frequency impulses generated externally of the cabinet from adversely affecting the operation of the equipment contained therein.

It is customary to provide such RFI shielded cabinets with adjustable shelving upon which various radio components can be mounted, and to selectively afford access to the component on each shelf. For this purpose, one side of the cabinet is usually provided with a rectangular opening and with detachable rectangular panels which collectively close the opening, the sides of which are defined by corner posts.

The panels all have the same width, which is substantially equal to the distance between the inner faces of the corner posts between which they fit, although they may have different heights which are multiples of one another and of the total height of the opening.

Since the horizontal edges of adjacent panels cannot intimately engage one another all along their length, the joints between such adjacent panels constitute critical areas of the cabinet at which electrical impulses at radio frequencies might pass. For this reason, so-called RFI gaskets have been employed at these joints, as well as along the vertical edges of the panels, so as to minimize the danger of radio frequency impulses leaking through the panel joints either into or out of the cabinet. RFI gaskets available for this purpose comprise an elongated core of readily yieldable rubber-like material and a sheath of woven or knitted wire mesh closely encircling the core.

This invention concerns the mounting of such RFI gaskets on the cabinet and its objective is to provide simplified but improved means for holding the gaskets in place.

More specifically, this invention has as its purpose the provision of an RFI shielded cabinet featuring horizontal cross bars which are readily detachably mounted on the cabinet and which can be adjusted without the use of tools of any kind to any desired spacing corresponding to the joints between adjacent detachable panels; and which cross bars afford means for holding RFI gaskets in place over the joints between adjacent panels.

Since good contact between the RFI gaskets and the panels is essential to effective shielding, the invention has as another of its objects to provide means whereby tightening of the fastening screws which hold the panels in place, causes the contiguous edge portions of adjacent panels to be forced towards the cross bar underlying those edges, and thus tightly against the gasket mounted on the cross bar.

With the above and other objects in view which will appear as the description proceeds, this invention resides in the novel construction, combination and arrangement of parts substantially as hereinafter described and more particualrly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figures 1, 2:
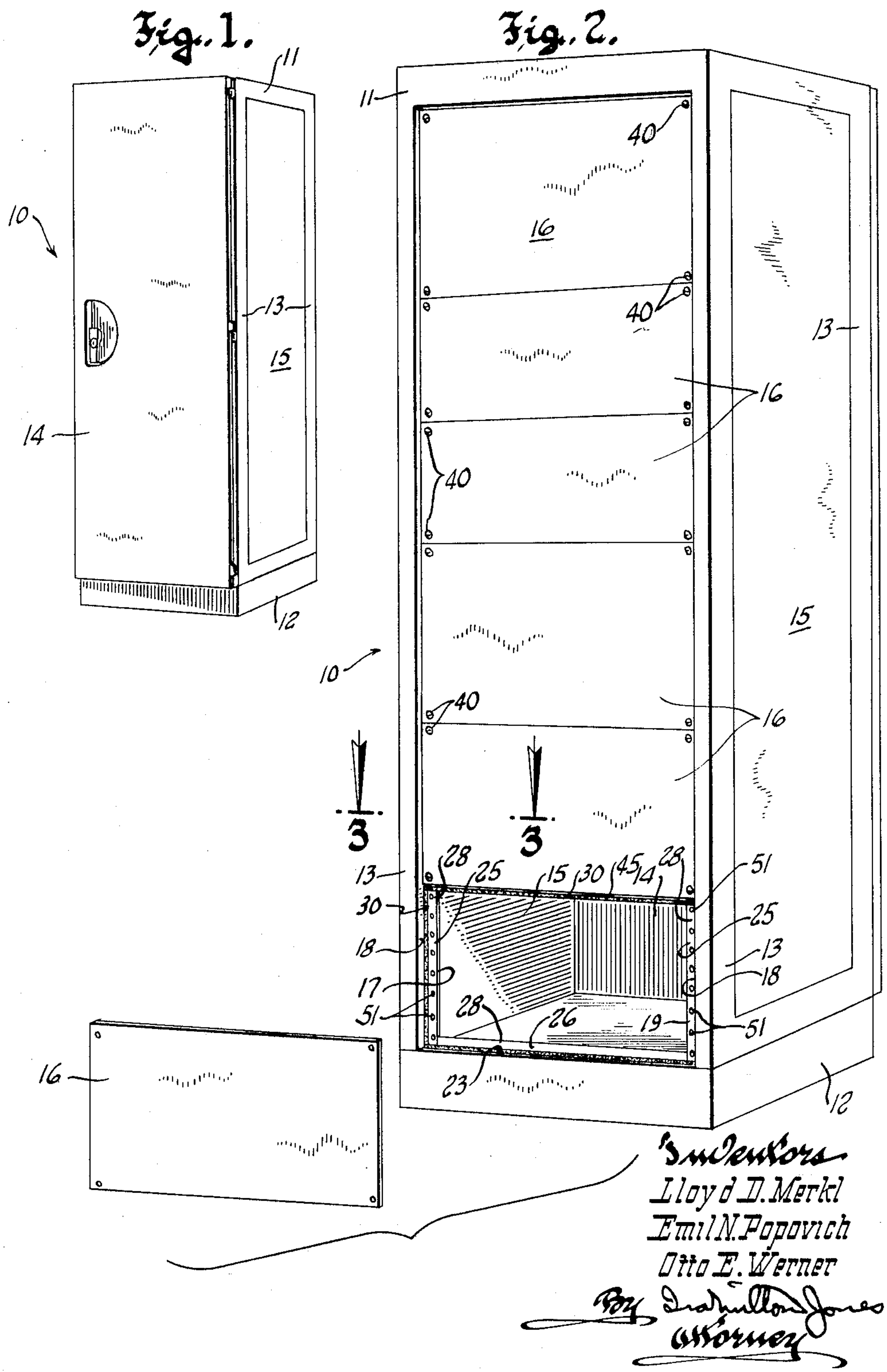
FIGURE 1 is a perspective view of an RFI shielded cabinet embodying this invention.
FIGURE 2 is an enlarged perspective of the cabinet seen in FIGURE 1, viewing the same from the rear and showing one of its panels displaced from the cabinet.

Referring now more particularly to the accompanying drawings, in which like reference characters identify like parts throughout the views, the numeral 10 generally designates an RFI shielded enclosure or cabinet constructed in accordance with this invention. The cabinet is fabricated from sheet metal and in its form illustrated has an upright frame that comprises rectangular top and bottom sections 11 and 12, respectively, and hollow upright posts 13 joining the top and bottom sections at the four corners of the cabinet. It may have a vertically elongated door 14 to provide access to the interior of the cabinet at one side, and two other sides 15 thereof may be provided by removable but flush-mounted panels, in a more or less conventional way, to facilitate series installation of a plurality of cabinets.

The fourth side of the cabinet, which can be considered its rear, is conjointly provided by a series of detachable rectangular panels 16, which close a vertically elongated access opening 17 in the cabinet. The panels 16, which may be simply relatively thick plates or sheets of aluminum, are arranged one above the other, and fit lengthwise between the opposing inner faces 18 of the rear posts 13 to collectively close the entire vertical space between the top and bottom cabinet sections 11 and 12, respectively, and—more specifically—the horizontal edge portions 23 thereof.

While the panels 16 all have the same length so as to fit between the rear posts 13, their height may vary in accordance with the spacing of the shelves, not shown, within the cabinet. Ordinarily, panels are provided in heights that are multiples of one another and of the vertical distance between the top and bottom cabinet sections.

Figures 3, 4, 5, 6, 7:
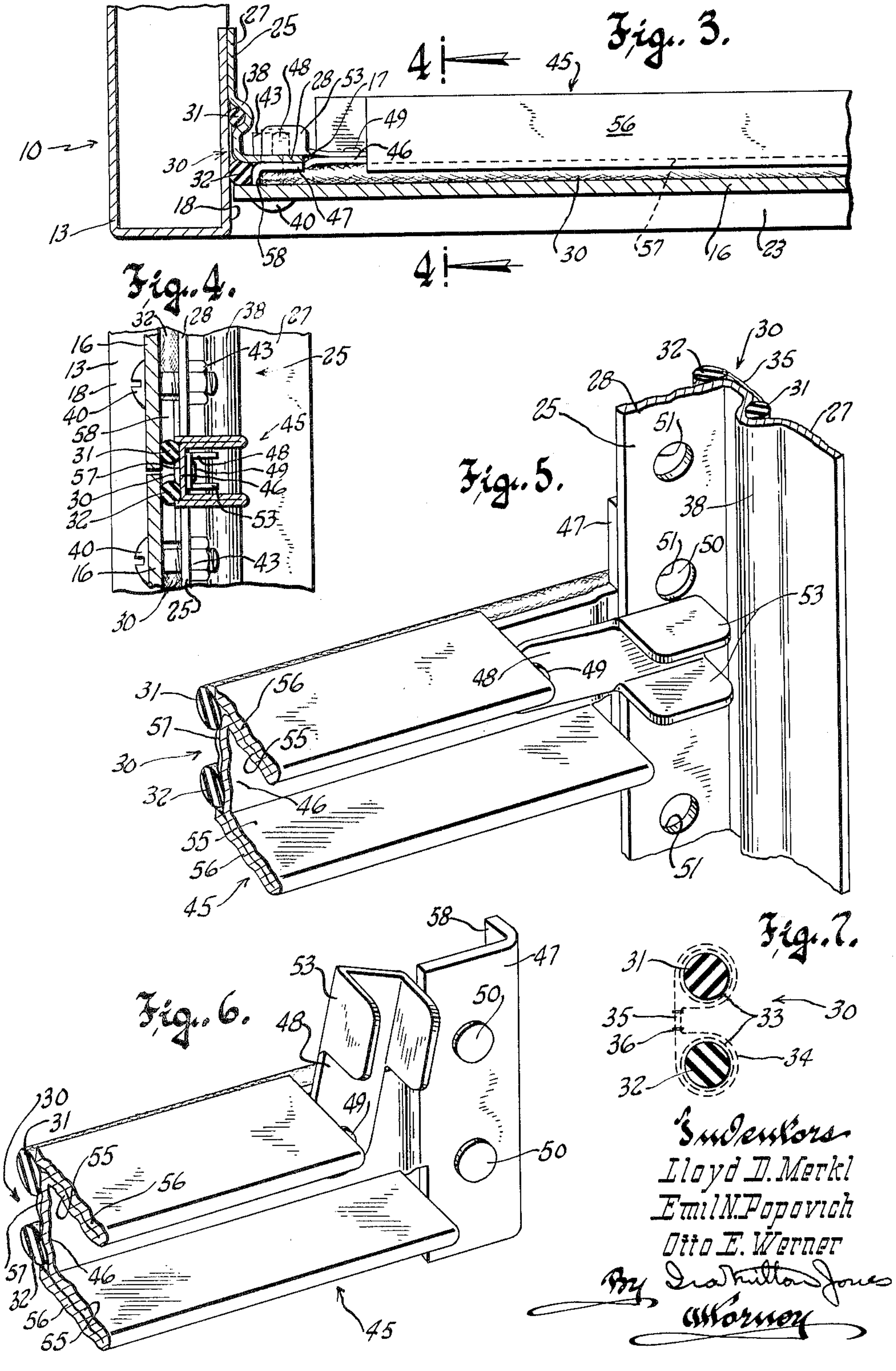
FIGURE 3 is a fragmentary sectional view at an enlarged scale, taken through FIGURE 2 on the plane of the line 3—3.
FIGURE 4 is a fragmentary sectional view taken through FIGURE 3 on the plane of the line 4—4.
FIGURE 5 is an enlarged fragmentary perspective view illustrating the detachable connection between one end portion of one of the cross bars and the cabinet frame.
FIGURE 6 is a fragmentary perspective view like FIGURE 5, but showing one end portion of the cross bar per se.
FIGURE 7 is an enlarged cross sectional view through an RFI shielding gasket of the type employed in this invention.

Vertical rails 25 are fixed to the inner faces 18 of the corner posts 13 at the opposite sides of the cabinet and horizontal rails 26 are fixed to top and bottom sections 11 and 12. As shown in FIGURE 3, each of the vertical rails is provided by an angle-shaped strip of sheet metal having an attaching flange, an inner portion 27 of which is flatwise welded or otherwise secured to the inner face of one of the rear posts 13, and having a leg 28 that is bent outwardly perpendicularly to the inner face of the post. The horizontal rails are similarly formed and secured to the top and bottom sections 11 and 12 of the cabinet, and likewise have legs 28 that are coplanar with those on the side rails. The edges at the outer extremities of the legs 28, of course, define the access opening 17 in the rear of the cabinet.

The rails 25 and 26 serve to mount an RFI gasket 30 on the rear of the cabinet. The RFI gasket is a continuous strip of special gasketing material that encircles the access opening 17. It has vertical stretches thereof at each side of the cabinet, and horizontal stretches along the top and bottom of the cabinet. As seen best in FIGURE 7, the RFI gasket is of the double core type, having an elongated inner core 31 of soft rubber-like material defining one side edge of the gasket and an elongated outer core 32 of similar rubber-like material defining the opposite side edge of the gasket strip. Each of these cores is encircled by a separate sheath 33 of woven or knit wire mesh, and the entire strip is enclosed within an outer mesh sheath 34 having overlapping web portions 35 tangent to the two cores and secured together at areas close to the strips by a double row of stitching 36.

The outer core 32 of the gasket strip is nested in the corners formed by the junctions of the outer faces of the legs 28 of the rails 25 with the inner faces 18 of the rear posts 13, and the outer faces 28 of the rails 26 with the horizontal surfaces 23 on the top and bottom sections 11 and 12. The web 35 of the gasket strip extends under the outer portions of the attaching flanges of the rails and is clamped between them and the adjacent surfaces of the posts and the surfaces 23 at the top and bottom of the cabinet; while the inner core 31 of the gasket strip is confined in an outwardly deformed bead 38 on the rails in the manner seen in FIGURE 3, to anchor the gasket in place on the cabinet. As shown in FIGURE 3, the inner core 31 of the gasket strip may be smaller in diameter than the outer core 32.

The marginal side portions of the rear face of all of the panels 16 bear against the outer core 32 of the adjacent gasket strips 30 to clamp the same between the panels and the legs 28 on the vertical rails 25 when the panels are secured to the back of the cabinet. The outer gasket cores 32 at the top and bottom of the cabinet are clamped between the top and bottom panels and the legs 28 of the horizontal rails 26, so that around the entire perimeter of the access spring 17, RFI gasketing provides protection against the leakage of radio frequency impulses either into or out of the cabinet.

The panels 16 are detachably held in place by bolts 40 which pass through holes in the panels and in the legs 28, and have their heads at the outer faces of the panels and their nuts 43 bearing against the inner faces of the legs 28. Since each panel is thus separately bolted in place, any one of them may be detached from the cabinet to provide access to the shelf space covered thereby.

While the RFI shielding around the perimeter of the opening 17 effectively shields against passage of electrical impulses at radio frequencies through the joints between the panels and the cabinet walls, unless the joints between the contiguous edges of the panels are also shielded, the desired protection will not be had. To achieve this additional shielding in a reliable and effective way is one of the main objectives of this invention. It is accomplished by a gasket strip 30 for each of said joints, substantially equal in length to the length of the panels, and a readily adjustable cross bar 45 on which each gasket strip is mounted.

Each of the cross bars 45 is fabricated from a single piece of sheet metal and comprises a web 46 long enough to span the access opening 17 and having upright cleats 47 formed on its outer ends to flatwise overlie the outer faces of the legs 28 on the cabinet side rails 25. The cleats 47 give each end portion of the web an appearance similar to the head of a T square wherein the web provides the blade of the T square but is offset slightly toward the plane of the legs 28 on the rails, as seen best in FIGURES 3 and 5. A short lever 48 is loosely pivoted on a rivet 49 to the web 46 at each end portion thereof and overlies the inner side of the web to have its outer end portion swing back and forth over the rear side of the adjacent leg 28 of the cabinet side rail 25, to enable the leg to be clamped between the lever and the adjacent cleat 47.

FIGURE 6 best illustrates that each of the cleats 47 has cross bar locating means on its underside, provided by a pair of projections or embossures 50 protruding from the cleat and disposed on a centerline at right angles to the length of the web 46. These protruding projections 50 are adapted to be engaged in adjacent holes 51 of a series thereof formed in the legs 28 of the side rails 25 at a uniform spacing corresponding to the spacing of the rivet heads, it being understood that each of the holes in one side rail is horizontally opposite one of the holes in the other side rail.

Hence, the cross bar can be horizontally located at the proper elevation on the back of the cabinet corresponding to the horizontal joint between two adjacent panels, by the engagement of the projections 50 on its cleats in adjacent holes 51 in the legs of the side rails. When thus located, the levers 48 on the ends of the bar can be swung over the rear sides of the legs 28 to releasably lock the cross bar in place on the rear of the cabinet.

Turned up flanges 53 on the free end of the levers provide convenient handles to facilitate actuation of the levers to and from their operative locking positions seen in FIGURE 5.

Each cross bar 45 is formed with a double channel-shaped cross section for rigidity, with a common web 46. For this purpose, it has spaced horizontal top and bottom or inner flanges 55 which extend inwardly from the web toward the interior of the cabinet, as well as outer flanges 56 which are bent flatwise back upon the inner flanges and extend outwardly a distance beyond the web 46 to provide a shallow channel 57 that is adapted to span the joint between adjacent panels 16, and in which a double core RFI gasket strip 30 can be accommodated.

In this case, both cores 31 and 32 of the gasket strip 30 have the same diameter, and the web 35 of the gasket strip is either spot welded or cemented to the web 46 of the cross bar 45, in flatwise engagement therewith. The forward extremities of the outer flanges 56 on the cross bar partially embrace the gasket cores 31 and 32 at the opposite sides of the strip, and aid in holding the strip in place on the cross bar.

With the arrangement described, each of the cross bars can be adjusted to a position at which the cores 31 and 32 on its gasket strip lie at opposite sides of the horizontal joints between two adjacent panels, and with each core in position to be engaged by one of the panels. Since the webs 46 of the cross bars are also disposed substantially coplanar with the vertically and horizontally extending legs 28 on the cabinet rails 25 and 26, the panels should engage the cores of the cross bar gasket strips and the outer core of the gasket that extends around the perimeter of the opening 17 with substantially the same pressure when the bolts 40 are tightened. It was found, however, that special attention had to be given the joints between the cross bars and the upper and lower edges of the panels.

Although the cross bars 45 are stiff and normally will not be deflected as the panels 16 are secured in place, to assure tight engagement between the horizontal edges of the panels and the adjacent RFI gasket strips 30 along the entire length of these edges, each of the cleats 47 at the outer ends of the cross bars has its outer edge bent perpendicularly outward to provide a flange 58. The edges of these flanges are parallel to the outer face of the adjacent legs 28 and are spaced therefrom a distance slightly less than the thickness of the adjacent gasket core 32. Hence, when the panels 16 are secured in place and drawn down against the gasket cores 32, the inner faces of the panels will bear against the edges of the flanges 58. Since these flanges are closer to the side edges of the panels than the rows of bolts 40, the tightening of the bolts will induce a slight inward bowing of the panels at their top and bottom edges and, in so doing, will assure tight engagement of these edge portions of the panels with the cross bar-carried gasket strips therebeneath.

The cross bar gasket strips should have their ends abutting the outer cores of the gasket strips at the sides of the opening 17, and to gain maximum stiffness for the cross bars the flanges thereon should extend substantially continuously from one side edge of the access opening 17 to the other, although the top flanges at both ends of each cross bar may be cut back a short distance to provide clearance for actuation of its levers 48 to their inoperative positions.

From the foregoing description, together with the accompanying drawings, it will be apparent that this invention not only provides a simple and inexpensive one-piece cross bar construction to which panel joint RFI gaskets are readily attachable, but also greatly simplifies adjustment of the horizontal RFI gaskets in correspondence with the joints between adjacent panels of different heights.

What we claim as our invention is:

1. A radio frequency interference shielded sheet metal cabinet of the type having a rectangular access opening and a plurality of detachable rectangular panels each spanning the width of said opening and arranged in edge-to-edge relation to collectively close the opening, characterized by the following:

(A) opposite pairs of elongated parallel rails fixed on the cabinet, said rails surrounding said access opening;

(B) said panels having marginal edge portions which overlie the rails along the adjacent edges of the access opening;

(C) adjacent panels having adjoining marginal edge portions which are spaced from the rails and which span the width of the access opening;

(D) a radio frequency interference shielding gasket extending continuously along said rails and confined between them and the adjacent marginal edge portions of the panels which overlie the rails;

(E) cross bars on the cabinet disposed behind and parallel to the adjoining marginal edge portions of adjacent panels, each of the cross bars spanning the width of the access opening and having end portions overlying the adjacent rails;

(F) means for detachably securing the ends of the cross bars to the adjacent rails;

(G) a radio frequency interference shielding gasket mounted on each cross bar and extending along the entire length thereof to have engagement with the adjoining marginal edge portions of two adjacent panels;

(H) means to detachably secure the panels in position comprising screw type fastening means spaced from the marginal edges of the panels which overlie the rails at the sides of the access opening and engaging said rails to draw the panels toward the rails and toward the cross bars; and (I) means to assure tight engagement between the panels and the radio interference shielding gaskets which are mounted on the cross bars, comprising abutment means on the ends of the cross bars engaging the adjacent inner faces of the panels laterally outwardly of said fastening means, so that tightening of the fastening means tends to bow the edge portions of the panels which overlie the cross bars toward the cross bars.

2. A radio frequency interference shielded sheet metal cabinet of the type having an upright rectangular access opening, with opposite side edges and upper and lower ends, and a plurality of detachable rectangular panels each spanning the width of said opening with its side edge portions contiguous to the sides of the opening, and arranged in edge-to-edge relation to collectively close the opening, adjacent panels having adjoining marginal edge portions, characterized by the following:

(A) elongated parallel rails fixed on the cabinet along the side edges of the access opening, the marginal side edge portions of the panels overlying said rails;

(B) cross bars on the cabinet disposed behind and parallel to the adjoining marginal edge portions of adjacent panels, each of the cross bars spanning the width of the access opening;

(C) a cleat on each end of each cross bar overlying the adjacent rail;

(D) means to detachably secure each cleat to its adjacent rail;

(E) a radio frequency interference shielding gasket mounted on each cross bar and extending along the entire length thereof, to have engagement with the adjoining marginal edge portions of two adjacent panels;

(G) fastening bolts passing through said rails and the adjacent side edge portions of the panels to secure the panels in position and draw the panels toward the cross bars; and (H) means to assure tight engagement between the adjoining marginal edge portions of the adjacent panels and the underlying radio frequency interference shielding gasket comprising an out-turned flange on each of said cleats bearing against the adjacent portions of the panels laterally outward of the fastening bolts, so that tightening of the bolts tends to bow the panels toward the cross bars.

3. In a cabinet having corner posts and cross bars spanning the space between two adjacent corner posts, means for readily detachably securing the ends of each crossbar to said adjacent posts at any one of a number of different locations spaced lengthwise thereof, said means comprising:

(A) an attaching flange on each of said adjacent corner posts extending lengthwise thereof, said flanges projecting edgewise towards one another, and each of said flanges having a row of equispaced holes;

(B) a cleat on each end of the cross bar to lie flatwise against one side of the adjacent attaching flange;

(C) a pair of sharply defined projections on one face of each cleat of a size to snugly fit the holes in the attaching flanges and spaced apart the same distance as said holes so that the projections at each end of the cross bar may be engaged in any two adjacent holes in the adjacent attaching flange; and (D) a lever pivoted to each end portion of the cross bar at the side thereof from which the projections extend, to swing to and from a position overlying the cleat and clamping the adjacent attaching flange between the lever and the cleat when the projections are received in holes in the attaching flange.

4. In a cabinet, the structure set forth in claim 3, wherein the cross bar has a channel shaped cross section, wherein the web of the channel shaped cross bar projects beyond the ends of its flanges, wherein the cleats are integral portions of the web, and wherein the projections extend from the cleats in the same direction as the flanges of the cross bar project from its web.

5. In a cabinet, the structure set forth in claim 4, wherein each cleat has a medial portion formed by an extension of the web of the cross bar, and opposite end portions formed by parts of the flanges of the cross bar which have been flattened into the plane of said medial portion.

6. In a cabinet, the structure set forth in claim 5, wherein the cleats are offset from the web of the cross bar in the direction away from that in which the flanges of the cross bar project from its web, by an amount substantially equal to the thickness of the attaching flanges, and wherein the levers are pivoted to the web of the cross bar with their pivoted end portions in flush engagement with the inner face of the web and their free end portions spaced from the plane of the web.

7. In a cabinet, the structure set forth in claim 6, wherein one flange at each end of the cross bar terminates inwardly of the other so as to provide clearance for the adjacent lever and allow the lever to be swung to a position crosswise of the cross bar.

8. In a cabinet having corner posts and cross bars spanning the space between two adjacent corner posts, means for readily detachably securing the opposite end portions of each cross bar to said adjacent posts at each of a number of different locations spaced lengthwise thereof, comprising:

(A) an attaching flange secured to and extending lengthwise along each of said adjacent corner posts, said flanges projecting toward one another and having face portions to flatwise overlappingly engage the end portions of the cross bar;

(B) interconnecting male and female locating and supporting elements on the overlapping end portions of the cross bar and the attaching flanges, to preclude all but flatwise separation of each end portion of the cross bar from its attaching flange, the locating and supporting elements on the attaching flanges being disposed at a number of locations spaced apart along their length so as to be selectively interconnectable with those on the end portions of the cross bar and thus provide for supporting the cross bar at different locations;

(C) and means for releasably holding the end portions of the cross bar against flatwise separation from their adjacent attaching flanges, comprising latch members on the end portions of the cross bar constrained to move along defined paths from operative positions overlying and substantially clamping the attaching flanges between them and the end portions of the cross bar to hold each of said end portions against flatwise separation from its attaching flange in any connected position of the cross bar on the attaching flanges, to inoperative positions disengaged from the attaching flanges to permit disconnection of said male and female elements.

9. A radio frequency interference shielded sheet metal cabinet of the type having a rectangular access opening and a plurality of detachable rectangular panels each spanning said opening and arranged in edge-to-edge relation, to collectively close the same, characterized by the following:

(A) opposite pairs of elongated parallel rails fixed on the cabinet, said rails surrounding and defining said access opening;

(B) said panels having marginal edge portions which overlie the rails along the adjacent edges of the access opening;

(C) adjacent panels having adjoining marginal edge portions which are spaced from the rails and which span the access opening;

(D) a radio frequency interference shielding gasket extending continuously along said rails and confined between them and the adjacent marginal edge portions of the panels which overlie the rails;

(E) cross bars on the cabinet, disposed behind and parallel to the adjoining marginal edge portions of adjacent panels, each of the cross bars spanning the access opening and having end portions overlying two opposite rails;

(F) a radio frequency interference shielding gasket mounted on each cross bar and extending along the entire length thereof to have engagement with the adjoining marginal edge portions of two adjacent panels;

(G) cooperating means on said two opposite rails and on the end portions of the cross bars interengageable substantially anywhere along the length of said two opposite rails to accurately locate the cross bars behind the adjoining marginal edge portions of adjacent panels, said cooperating means comprising interengageable male and female elements, the rails having their elements equispaced along their length so that the elements on the cross bars can be interengaged with any opposite elements on the rails;

(H) and latch levers pivotally mounted on the end portions of each cross car, to swing to and from operative positions clamping portions of said two opposite rails between them and the end portions of the cross bar so as to releasably hold the male and female elements thereof interengaged.

10. The radio frequency interference shielded cabinet of claim 9, further characterized by means to assure tight engagement between the adjoining marginal edge portions of the panels and the radio frequency interference shielding gasket on the adjacent cross bars, comprising out-turned flanges on the extremities of the end portions of the cross bars to engage the adjacent portions of the panels, and screw type fastening means located inwardly of said flanges to draw the panels toward the underlying rails and thereby tend to bow the marginal portions of the panels toward the cross rails.

References Cited by the Examiner

UNITED STATES PATENTS

| | | | |
|---|---|---|---|
| 2,639,042 | 5/1953 | Lambert et al. | 211—182 X |
| 2,912,294 | 11/1959 | Wells et al. | |

OTHER REFERENCES

Cooney: "How To Suppress Radio Interference," published in Electrical Manufacturing, September 1954, vol. 54, No. 3, pp. 109–128.

JOHN F. BURNS, *Primary Examiner.*

DARRELL L. CLAY, *Examiner.*